C. W. BROWN.
SIDE SPLASH MUD GUARD.
APPLICATION FILED DEC. 28, 1916.
1,362,841. Patented Dec. 21, 1920.
3 SHEETS—SHEET 3.
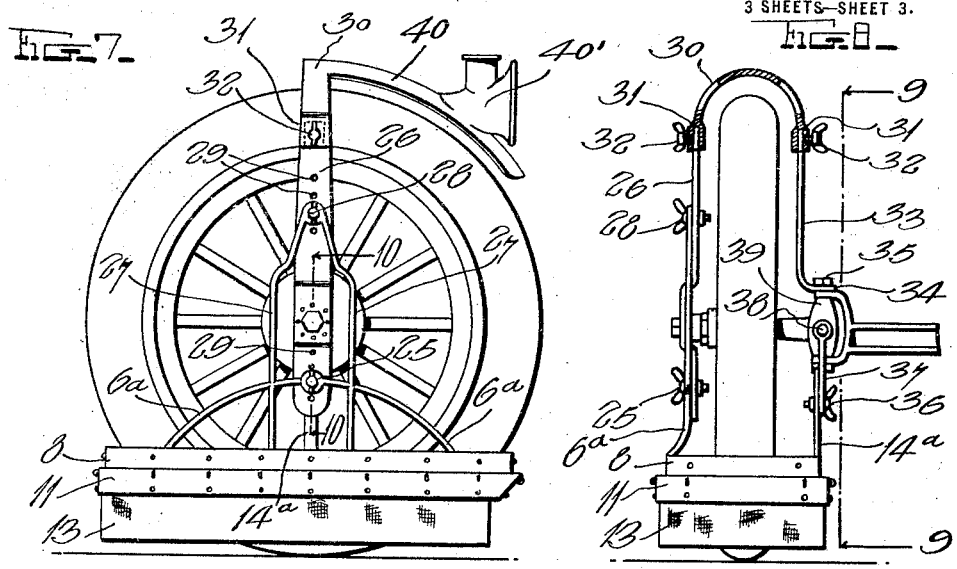
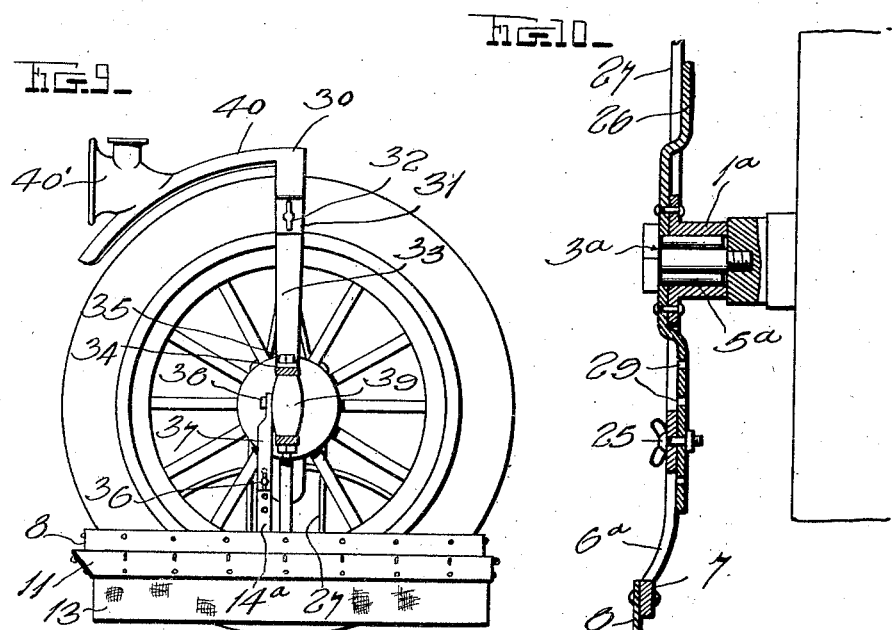
Witness
H. Woodard
Inventor
C. W. Brown
By H. B. Willson &co
Attorneys

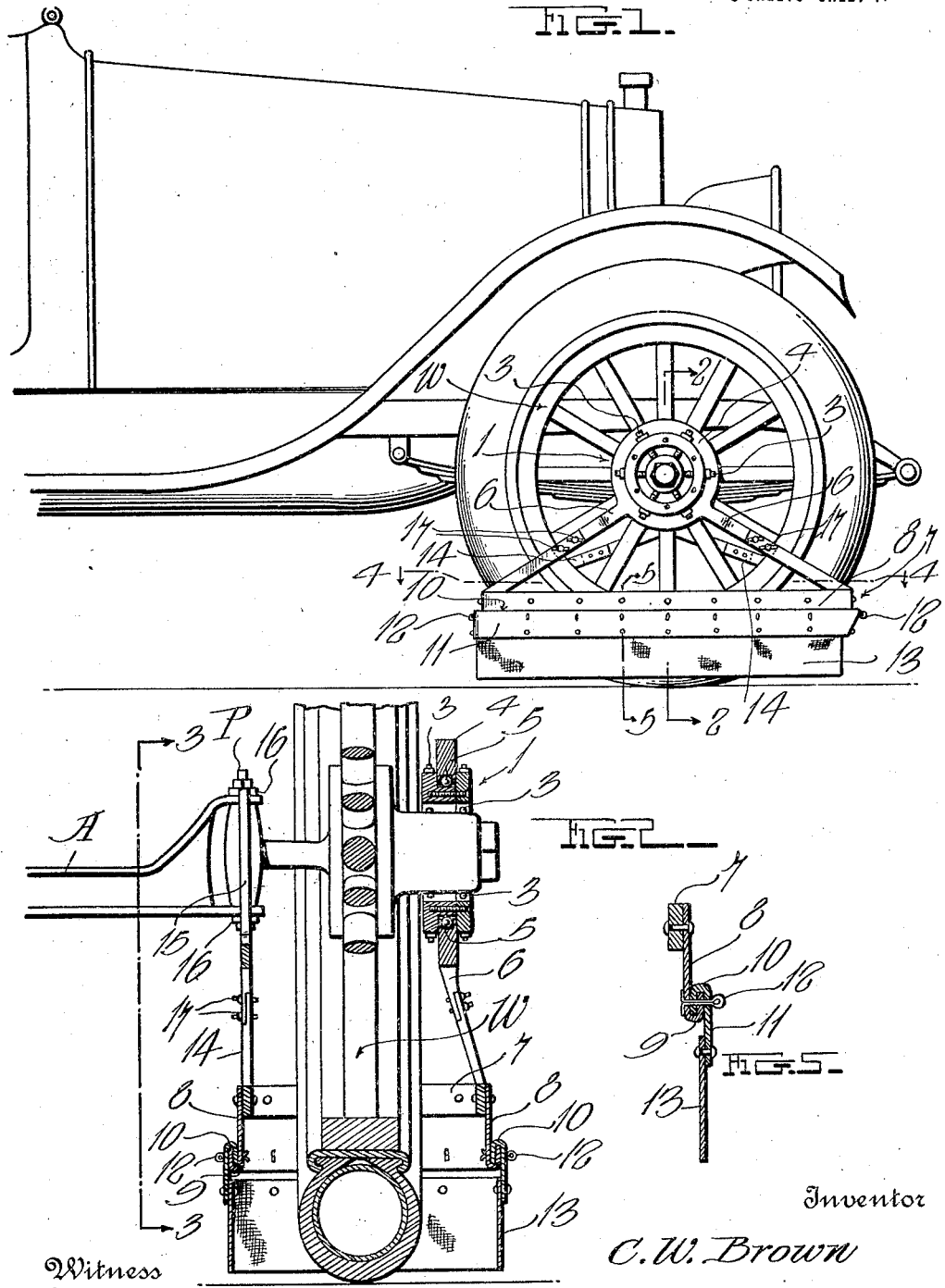

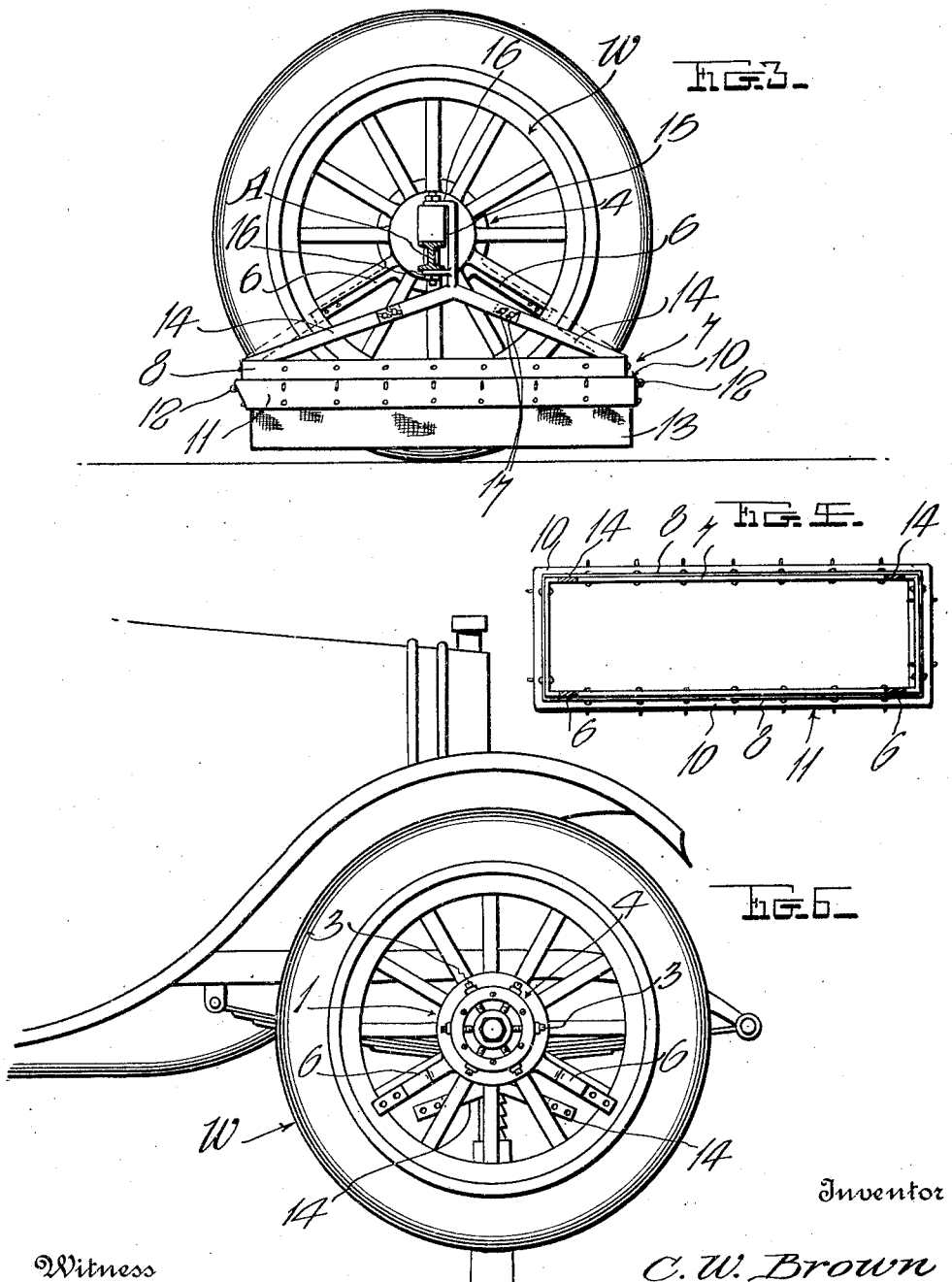

UNITED STATES PATENT OFFICE.

CHARLES W. BROWN, OF BOSTON, MASSACHUSETTS.

SIDE-SPLASH MUD-GUARD.

1,362,841. Specification of Letters Patent. Patented Dec. 21, 1920.

Application filed December 28, 1916. Serial No. 139,338.

*To all whom it may concern:*

Be it known that I, CHARLES W. BROWN, a citizen of the United States, residing at Boston, in the county of Suffolk and State of Massachusetts, have invented certain new and useful Improvements in Side-Splash Mud-Guards; and I do declare the following to be a full, clear, and exact description of the invention, such as will enable others skilled in the art to which it appertains to make and use the same.

My invention has for its object to provide a simple and inexpensive yet highly efficient guard for preventing mud and the like from splashing sidewise from vehicle wheels onto pedestrians and with this end in view the invention resides in certain novel features of construction and in unique combinations of parts to be hereinafter fully described and claimed, the descriptive matter being supplemented by the accompanying drawings which constitute a part of this application and in which:

Figure 1 is an outer side elevation of the guard applied;

Fig. 2 is a vertical section on the plane of the line 2—2 of Fig. 1;

Fig. 3 is a vertical section on the plane designated by the line 3—3 of Fig. 2, showing an inner side elevation of the guard;

Fig. 4 is a horizontal section on the plane indicated by the line 4—4 of Fig. 1;

Fig. 5 is a detail vertical section through one side of the guard taken on the plane of the line 5—5 of Fig. 1;

Fig. 6 is a side elevation showing the guard removed for the purpose of changing tires;

Fig. 7 is a view similar to Fig. 1, showing a different form of construction;

Fig. 8 is a front elevation of Fig. 7, with parts broken away and in section;

Fig. 9 is a vertical section on the plane of the line 9—9 of Fig. 8;

Fig. 10 is an enlarged vertical section taken on the plane indicated by the line 10—10 of Fig. 7;

Fig. 11 is a view similar to Fig. 9, showing yet another modified form of construction.

In Figs. 1 to 6 of the drawings above briefly described the numeral 1 designates a suitable two-part bearing having radially extending screws 3 for clamping it on the outer end of the hub of a vehicle wheel, said bearing having a peripheral groove in which the inner edge of a ring 4 is received, ball or roller bearings 5 being provided between said ring and bearing to permit the latter to rotate freely in the former. The numeral 1 can also designate a two-part bearing, said bearing being the hub of the wheel so shaped as to have a peripheral groove in which the inner edge of the ring 4 is received.

A pair of arms 6 are formed integrally at their upper ends with the ring 4 and diverge downwardly from said ring, their lower ends being joined in any appropriate manner to a horizontally disposed open frame 7 shaped to partially or totally surround the lower portion of the wheel to which the invention is applied, the upper edge of a resilient apron 8 being riveted or otherwise secured to said frame.

The apron 8 is intended to yield when striking curbs and the like and is preferably constructed of spring steel. The lower edge of said apron is turned outwardly and upwardly as shown at 9 and is in interlocking engagement with the downwardly and inwardly turned upper edge 10 of a sheet metal frame 11 which surrounds the lower portion of said apron, the latter and said frame being held in operative relation by means of cotter pins or the like 12 passed therethrough (see Fig. 5).

Riveted or secured in any appropriate manner to the lower edge of the frame 11 is a flexible guard apron 13 by preference constructed of canvas permeated with rubber. It will be understood, however, that any suitable material may be employed in constructing the apron 13.

Rising from the inner edge of the frame 7 are upwardly converging rigid arms 14 whose upper ends preferably terminate in a vertical stem 15. When the device is to be employed in connection with the front wheels of automobiles or the like, the arms 14 will be equipped with perforated ears 16 preferably carried by the stem 15 thereof, said ears being adapted to receive the upper and lower ends of the king pins P which connect the front wheels W pivotally with the axle A. On the form of the device used on the rear wheels of the vehicle, however, other suitable means may be employed in lieu of the ears 16 for attaching the arms 14 to the rear axle or to a suitable part on said axle or adjacent the same.

All of the arms 6 and 14 are formed of upper and lower sections detachably secured together by thumb screws or the like 17 so that the entire body portion of the guard may be removed as shown in Fig. 6 for the purpose of permitting tires to be removed and attached.

In Figs. 7 and 10, different construction is employed for securing the parts 7, 8, 11 and 13 to the vehicle. The outer side of the frame 7 is provided with upwardly and inwardly extending arms $6^a$ which are integrally joined at their upper ends and secured by a wing bolt or the like 25 to the lower end of a vertically disposed bar or arm 26 secured between its ends to a ring $1^a$ connected rotatably with the wheel hub by a single screw $3^a$ as shown in Fig. 10, ball or roller bearings $5^a$ being employed to permit said screw to rotate freely within the ring. Other arms 27 rise from the outer side of the frame 7 and are integrally joined at their upper ends, a wing bolt 28 being provided for securing said ends to the upper portion of the bar 26. This bar is provided with vertical rows of openings 29 through which the bolts 25 and 28 pass so that the guard may be adjusted vertically for use on wheels of different diameters.

An arched bar 30 passes over the wheel and is provided at its ends with sockets 31 having thumb screws or other suitable fasteners 32, one of said sockets receiving the upper end of the bar 26 while the upper end of another bar 33 is secured in the other socket, the lower end of bar 33 being bent laterally to form a foot 34 shown in Figs. 8 and 9 as secured to the vehicle by means of one of the king bolts 35 which pivot the front wheels to the front axle. It will be understood, however, that if the improved guard is used on the rear wheels the feet 34 will be secured to the rear axle housing or to any other suitable part.

An arm $14^a$ rises from the inner side of the frame 7 and by means of a wing bolt or the like 36 is secured to an attaching bar 37 which is shown secured by means of a screw 38 to one of the steering knuckles 39. By removing the bolts 25 and 36, the guard proper may be detached when the wheel is jacked up as shown in Fig. 6, and loosening of the set screws 32 will then permit detachment of the arched bar 30, so that the tire may readily be changed.

Preferably employed in connection with the features shown in Figs. 7 to 10, is a lamp bracket 40 extending forwardly from the arched bar 30 and carrying a suitable headlight 40'. By this arrangement, the rays of the light will be swung from side to side as the wheels are turned and thus the roadway will be illuminated when making turns as well as when traveling straight ahead.

In Fig. 11, another type of the invention is shown. In this figure, 50 designates an arched mud guard which extends over the wheel and terminates at points adjacent the ground, being secured in place in any suitable manner by arms 51, the lower ends of said guard carrying the side splash guard 52 while the upper portion of said guard 50 is provided with a headlight 53 which will of course be swung from side to side as the wheel is turned in steering the vehicle.

From the foregoing, taken in connection with the accompanying drawings, the construction, manner of operation and advantages of the invention will be readily understood without requiring a more extended explanation but it may be well to explain that within the scope of the invention as claimed, numerous changes may be made without sacrificing the principal advantages.

I claim:

1. A side splash guard for vehicles comprising a ring adapted to be mounted rotatably on the outer end of a wheel hub, a pair of downwardly diverging outer arms depending rigidly from said ring, a horizontal open frame rigidly secured to the lower ends of said arms and shaped to extend around the lower portion of the wheel, a pair of downwardly converging inner arms rising rigidly from the inner side of said frame and having means for securing them to a part of the vehicle fixed against rotation with the wheel, and a guard apron depending from the frame.

2. A side splash guard for automobiles comprising a horizontal open frame shaped to extend around the lower portion of one of the front wheels, a pair of rigid arms converging upwardly from the inner side of said frame and terminating in a vertical stem having upper and lower perforated ears to receive the king pin which pivotally connects the wheel with the front axle, and a guard apron depending from the frame.

3. A side splash guard for vehicles comprising a rigid horizontal open frame shaped to extend around the lower portion of a wheel, means for securing said frame in place, a spring metal apron secured to and depending from said frame, said apron having its lower edge turned outwardly and upwardly, a sheet metal frame surrounding the lower portion of said apron and having its upper edge turned inwardly and downwardly into interlocking engagement with said lower edge of the spring metal apron, pins passing through the apron and through said sheet metal frame for securing the latter in place, and a flexible guard apron depending from said sheet metal frame.

In testimony whereof I have hereunto set my hand in the presence of two subscribing witnesses.

CHARLES W. BROWN.

Witnesses:
JAMES R. FLANAGAN,
JAMES D. McQUAID.